(12) United States Patent
Dudar (10) Patent No.: US 9,751,396 B2
(45) Date of Patent: Sep. 5, 2017

(54) FUEL TANK PRESSURE SENSOR RATIONALITY FOR A HYBRID VEHICLE DURING REFUELING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 14/630,314

(22) Filed: Feb. 24, 2015

(65) Prior Publication Data

US 2016/0243931 A1 Aug. 25, 2016

(51) Int. Cl.
| | |
|---|---|
| *B60K 15/035* | (2006.01) |
| *F02D 29/02* | (2006.01) |
| *F02D 41/22* | (2006.01) |
| *F02D 41/00* | (2006.01) |
| *B60W 20/16* | (2016.01) |
| *F02M 25/08* | (2006.01) |
| *B60K 15/03* | (2006.01) |

(52) U.S. Cl.
CPC .. *B60K 15/03504* (2013.01); *B60K 15/03519* (2013.01); *B60W 20/16* (2016.01); *F02D 29/02* (2013.01); *F02D 41/003* (2013.01); *F02D 41/222* (2013.01); *F02M 25/0809* (2013.01); *F02M 25/089* (2013.01); *B60K 2015/0321* (2013.01); *B60K 2015/03302* (2013.01); *B60K 2015/03514* (2013.01); *B60K 2015/03576* (2013.01); *B60W 2530/00* (2013.01); *B60W 2710/06* (2013.01); *F02D 2041/223* (2013.01); *F02D 2200/0602* (2013.01); *Y10S 903/905* (2013.01)

(58) Field of Classification Search
CPC .......... B60K 15/03504; B60K 15/3519; B60K 2015/03576; B60W 20/16; F02D 41/003; F02D 41/222; F02D 2041/223; F02M 25/0818; F02M 25/0809
See application file for complete search history.

(56) References Cited

U.S. PATENT DOCUMENTS

| | | | |
|---|---|---|---|
| 8,342,157 B2 | 1/2013 | Der Manuelian et al. | |
| 8,353,273 B2 | 1/2013 | McLain et al. | |
| 9,217,397 B2* | 12/2015 | Peters | F02M 25/0854 |
| 2003/0061871 A1* | 4/2003 | Oki | F02M 25/0827 |
| | | | 73/114.41 |
| 2003/0226549 A1* | 12/2003 | Takagi | F02M 25/0818 |
| | | | 123/520 |
| 2006/0142931 A1 | 6/2006 | Cho | |
| 2008/0035122 A1* | 2/2008 | Thomas | F02D 41/0032 |
| | | | 123/520 |

(Continued)

FOREIGN PATENT DOCUMENTS

| | | |
|---|---|---|
| EP | 1526269 A2 | 4/2005 |
| KR | 20030081713 A | 10/2003 |

*Primary Examiner* — Dale Moyer
(74) *Attorney, Agent, or Firm* — James Dottavio; McCoy Russell LLP (57) ABSTRACT

Methods and systems are provided for performing fuel tank pressure sensor rationality for a hybrid electric vehicle during refueling. In one example, a method may include indicating degradation of the fuel tank pressure sensor based on the pressure detected in the canister vent line when the canister vent line is restricted.

20 Claims, 8 Drawing Sheets

(56) References Cited

U.S. PATENT DOCUMENTS

| | | | |
|---|---|---|---|
| 2010/0223984 A1* | 9/2010 | Pursifull | F02M 25/0836 73/114.39 |
| 2011/0166765 A1* | 7/2011 | DeBastos | B60K 15/03504 701/102 |
| 2011/0168140 A1* | 7/2011 | DeBastos | F02M 25/0818 123/521 |
| 2011/0197862 A1 | 8/2011 | Der Manuelian et al. | |
| 2011/0295482 A1* | 12/2011 | Pearce | B60K 15/03504 701/102 |
| 2012/0152210 A1 | 6/2012 | Reddy et al. | |
| 2014/0360260 A1* | 12/2014 | Dudar | G01F 23/22 73/204.11 |
| 2015/0075501 A1* | 3/2015 | Peters | F02M 25/0854 123/520 |
| 2015/0275790 A1* | 10/2015 | Matsunaga | F02M 25/089 123/519 |
| 2016/0243931 A1* | 8/2016 | Dudar | F02D 41/003 |

* cited by examiner

FUEL TANK PRESSURE SENSOR RATIONALITY FOR A HYBRID VEHICLE DURING REFUELING

FIELD

The present description relates generally to methods and systems for performing fuel tank pressure sensor rationality for a hybrid electric vehicle during refueling.

BACKGROUND/SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere. Further, various valves and/or sensors in the emission control systems may need to be intermittently diagnosed for degradation.

Emission control system diagnostic routines may rely on naturally generated pressure and/or vacuum during diurnal cycles, for example. One example approach is described in U.S. Pat. No. 8,353,273 to McClain. In McClain, a diurnal control valve coupling a fuel tank to a fuel vapor canister is opened and a pressure in a canister vent line is correlated to changes in fuel tank pressure to determine if degradation of the emission control system is present.

However, the inventors herein have recognized an issue with the above approach. During certain conditions, the fuel tank may be equal to atmospheric pressure, and thus there may be no pressure differences to detect within the canister vent line. As such, it may be impossible to differentiate between a degraded fuel tank pressure sensor and a diurnal control valve that is stuck closed.

Accordingly, methods and systems are provided herein to address the above issues. One example method for a fuel emissions system of a hybrid vehicle comprises during a refueling event, maintaining a fuel vapor canister vent line restriction and indicating degradation of a fuel tank pressure sensor based on a pressure in the canister vent line.

In this way, pressure that builds as a result of a fuel tank refueling may be used to correlate pressure in the canister vent line with pressure measured by a fuel tank pressure sensor. If the pressures measured in the canister vent line and fuel tank do not correlate (e.g., if one pressure does not change while the other pressure changes), degradation of the fuel tank pressure sensor, canister vent line pressure sensor, or fuel tank isolation valve may be determined. By doing so, emission control system integrity may be monitored even during conditions where fuel tank pressure is equal to atmospheric pressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
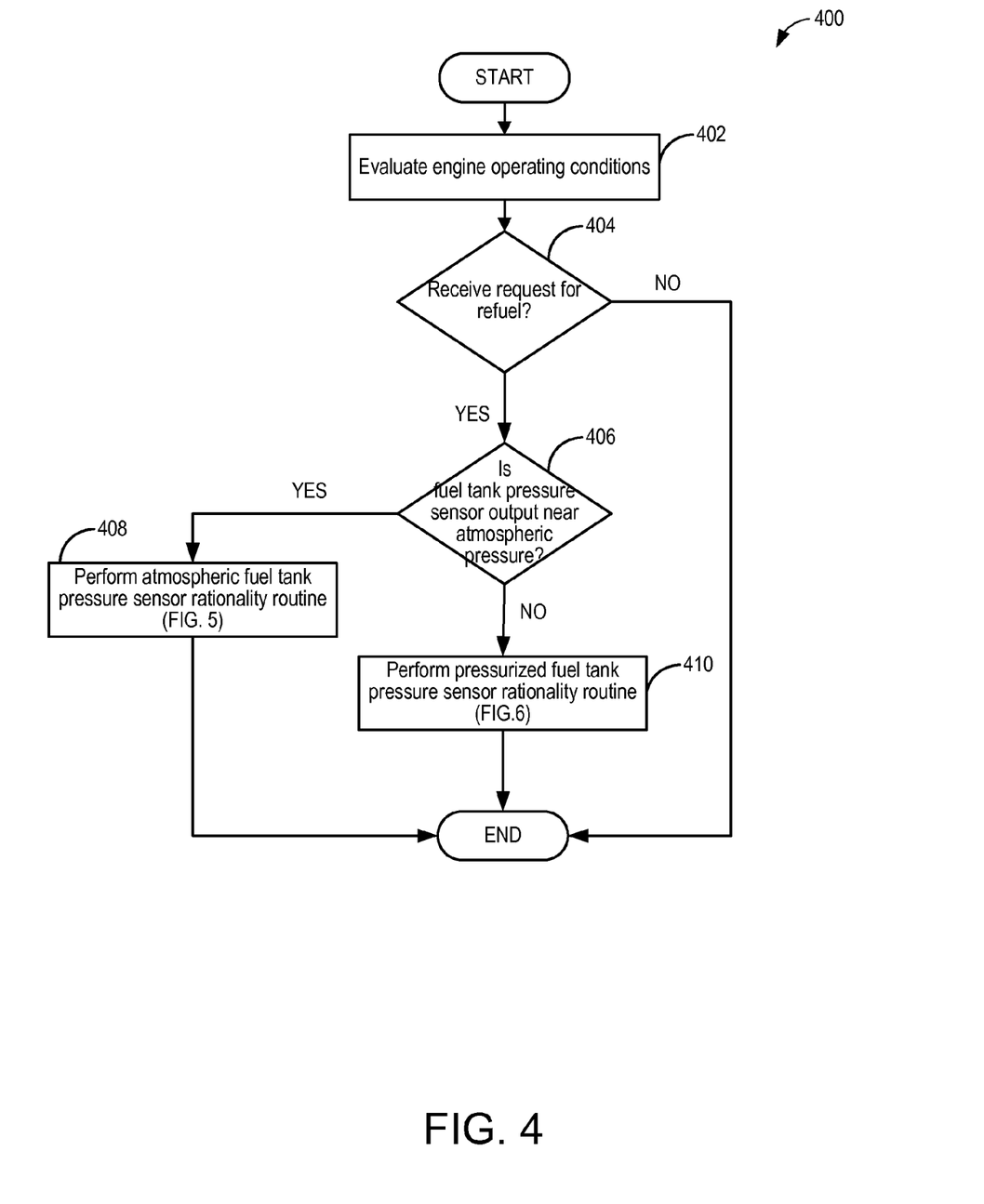
FIG. 4 shows a high level flow chart for selecting a fuel tank pressure sensor rationality routine.
Figure 5:
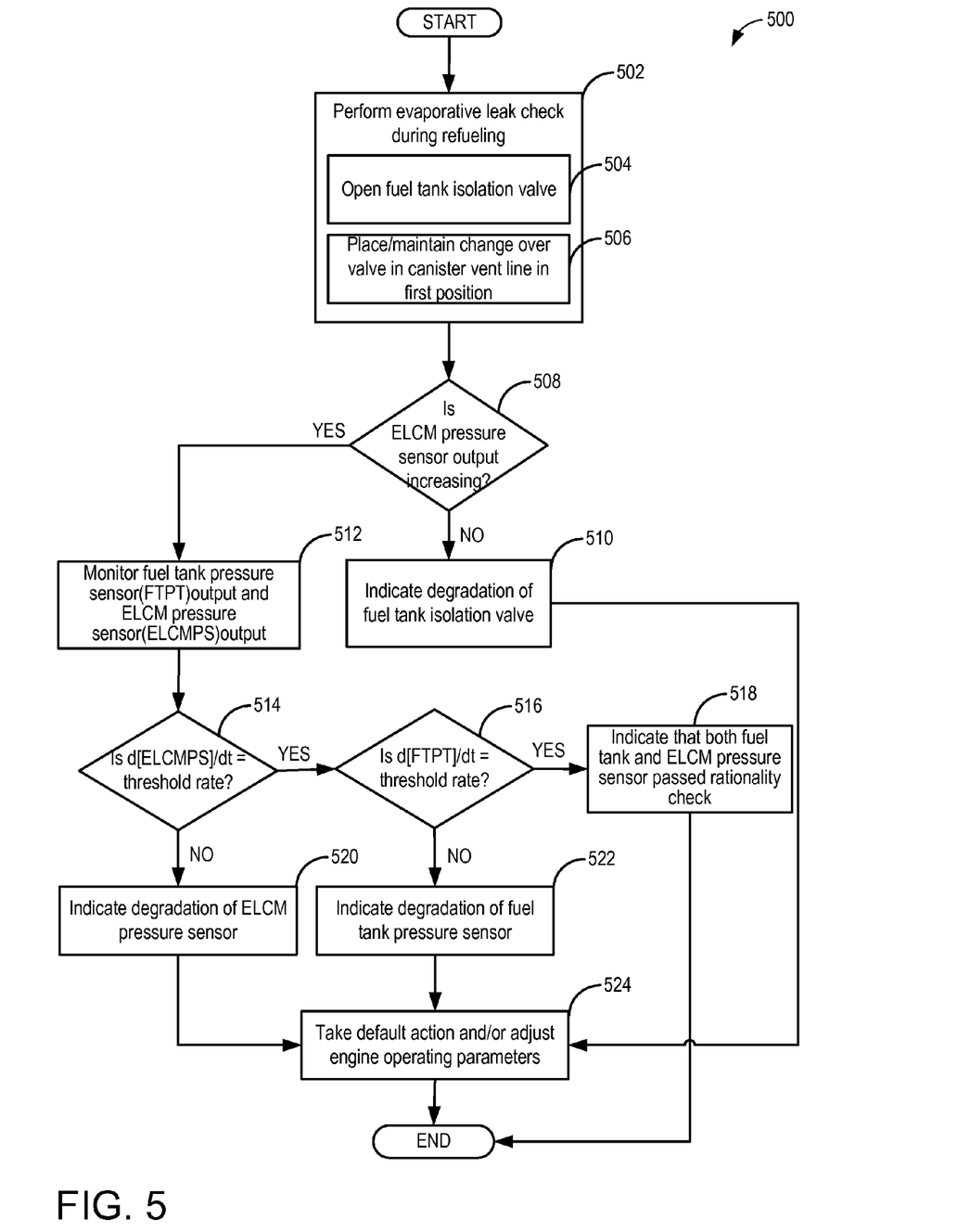
FIG. 5 shows a high level flow chart for performing an atmospheric fuel tank pressure sensor rationality routine.
Figure 6:
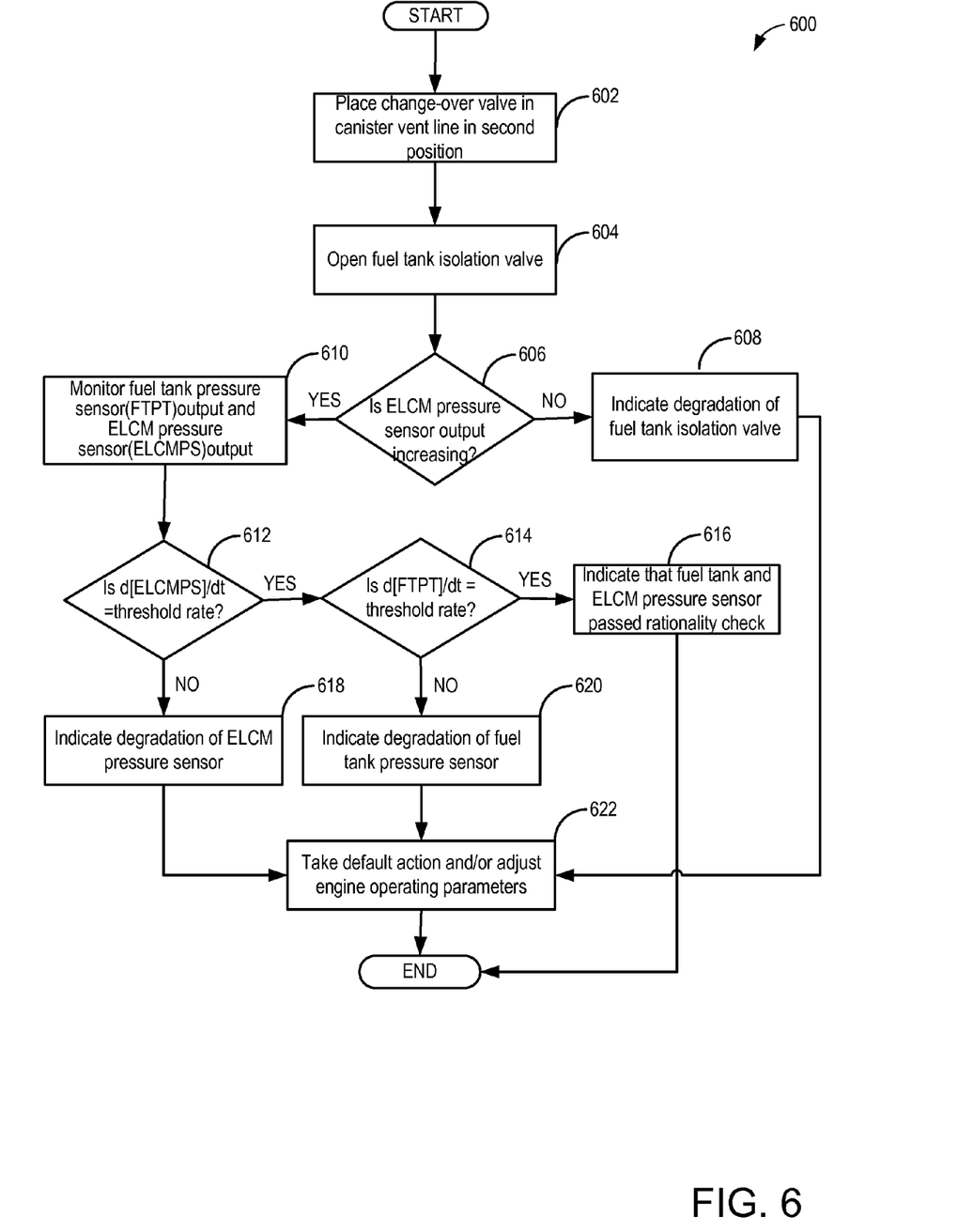
FIG. 6 shows a high level flow chart for performing a pressurized fuel tank pressure sensor rationality routine.
Figure 7:
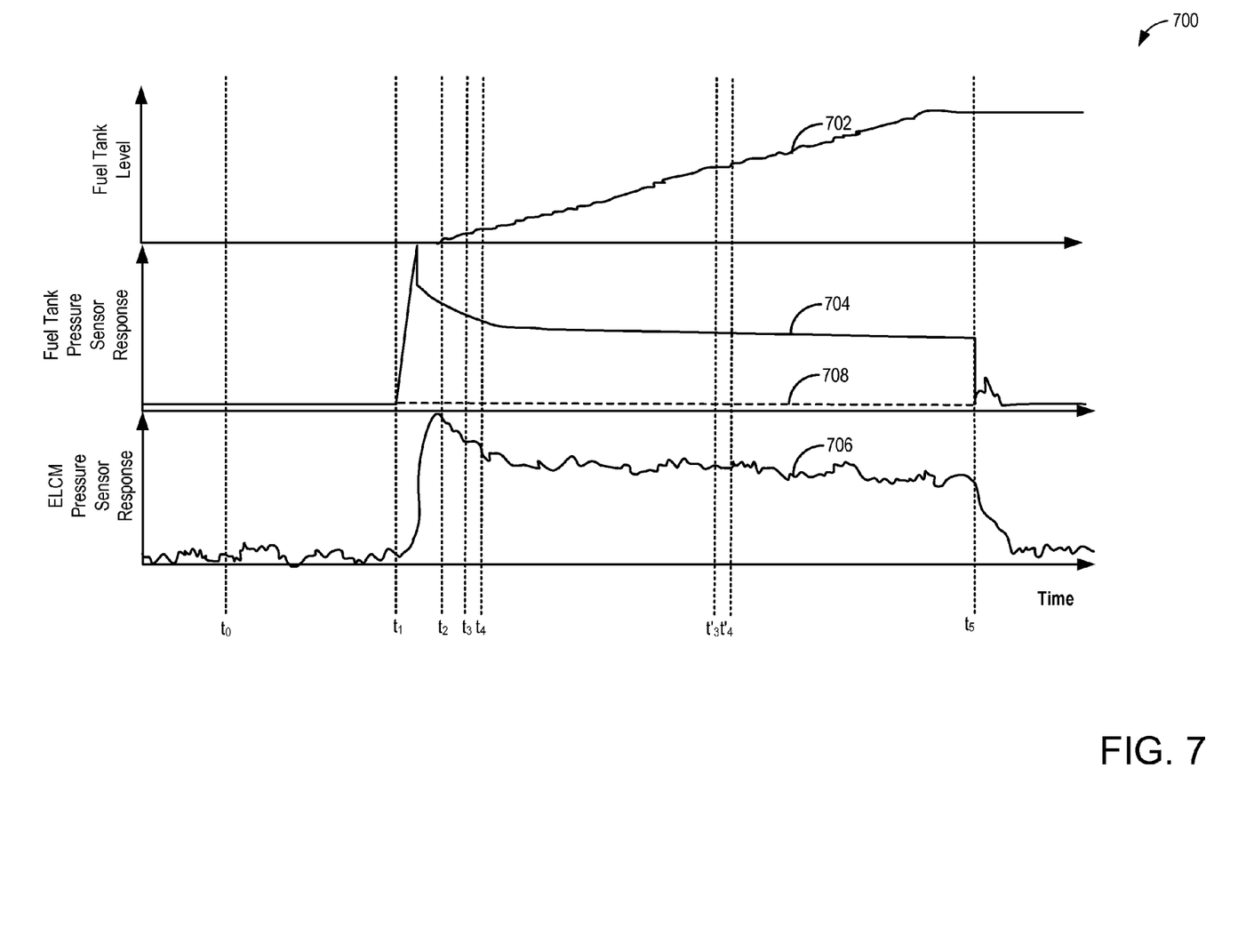
FIG. 7 shows an example relationship of fuel tank and canister vent line pressure sensor outputs during an atmospheric fuel tank pressure sensor rationality routine.
Figure 8:
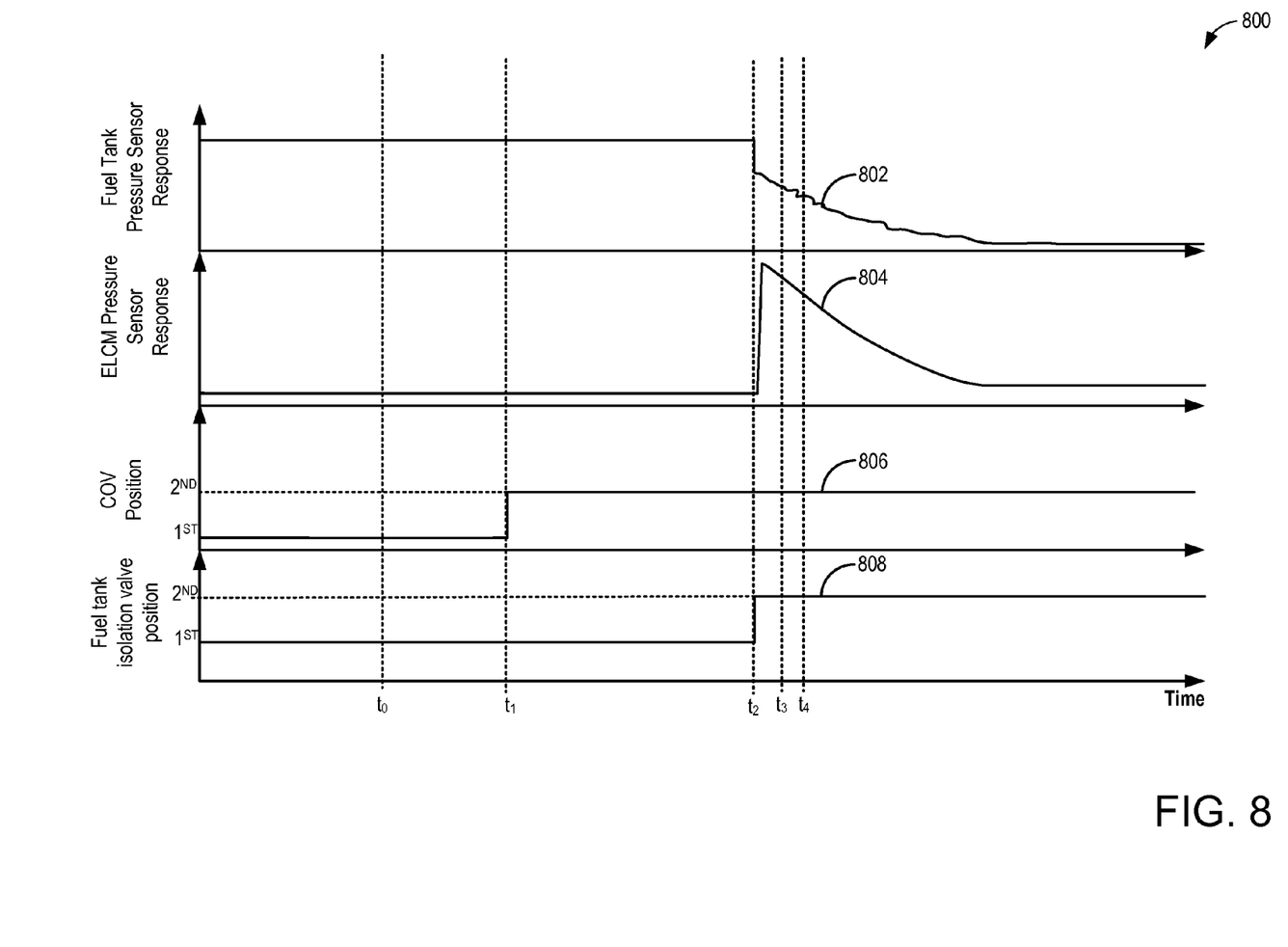
FIG. 8 shows an example relationship of fuel tank and canister vent line pressure sensor outputs during a pressurized fuel tank pressure sensor rationality routine.

The following description relates to methods and systems for performing fuel tank pressure sensor rationality checks for a hybrid electric vehicle during refueling. A rationality check may take place in a hybrid vehicle, such as the hybrid vehicle schematically depicted in FIG. 1. The hybrid vehicle may comprise a fuel system and an evaporative emissions system, as depicted in FIG. 2. The hybrid vehicle may further comprise an evaporative leak check module (ELCM), comprising a vacuum pump and a changeover valve (COV) operable in configurations, as shown in FIGS. 3A-3D. A controller may be configured to perform a deterministic routine, such as the routine of FIG. 4, to determine one of two pressure sensor rationality tests, which are illustrated in FIGS. 5 and 6. FIG. 5 shows a method for performing an atmospheric fuel tank pressure sensor rationality routine while FIG. 6 shows a method for performing a pressurized fuel tank pressure sensor rationality routine. An example timeline depicting the change in the outputs of a fuel tank pressure sensor and an ELCM pressure sensor while refueling during the atmospheric rationality check is shown in FIG. 7. An example timeline depicting the change in the outputs of a fuel tank pressure sensor and an ELCM pressure sensor while refueling during the pressurized rationality check is shown in FIG. 8.

Figure 1:
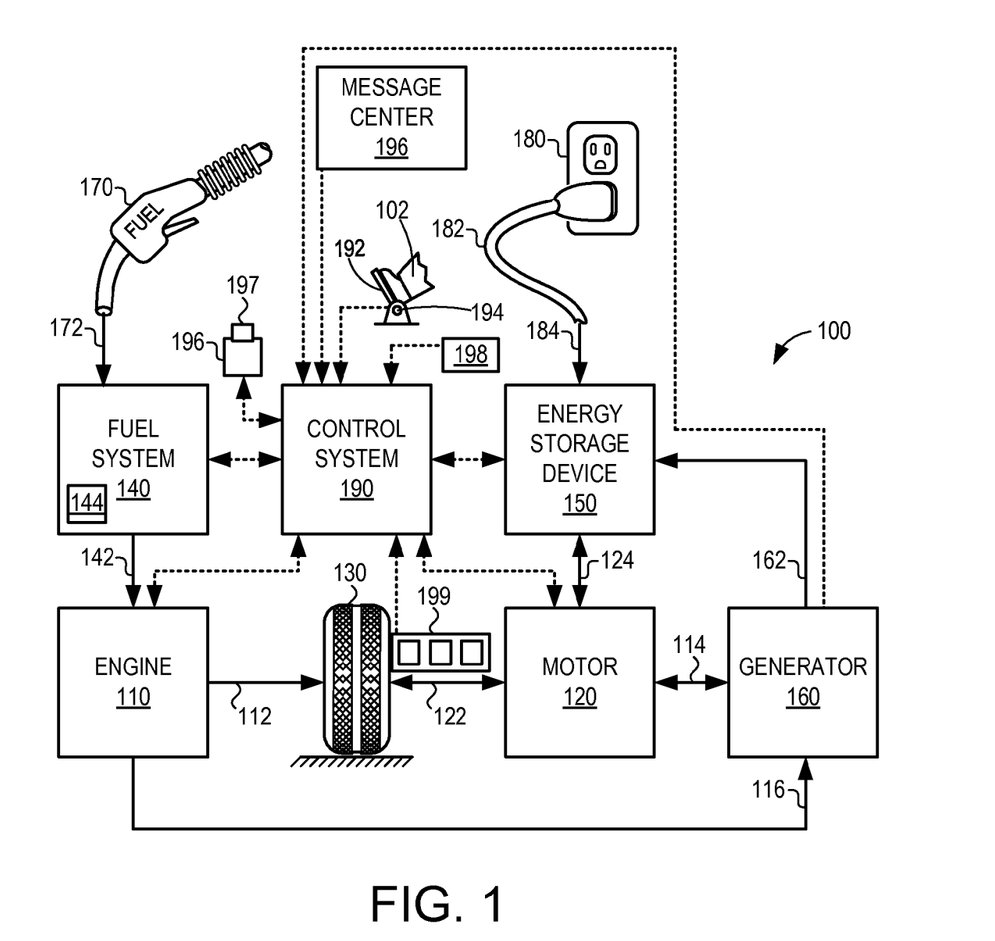
FIG. 1 schematically shows an example vehicle propulsion system.
Figure 2:
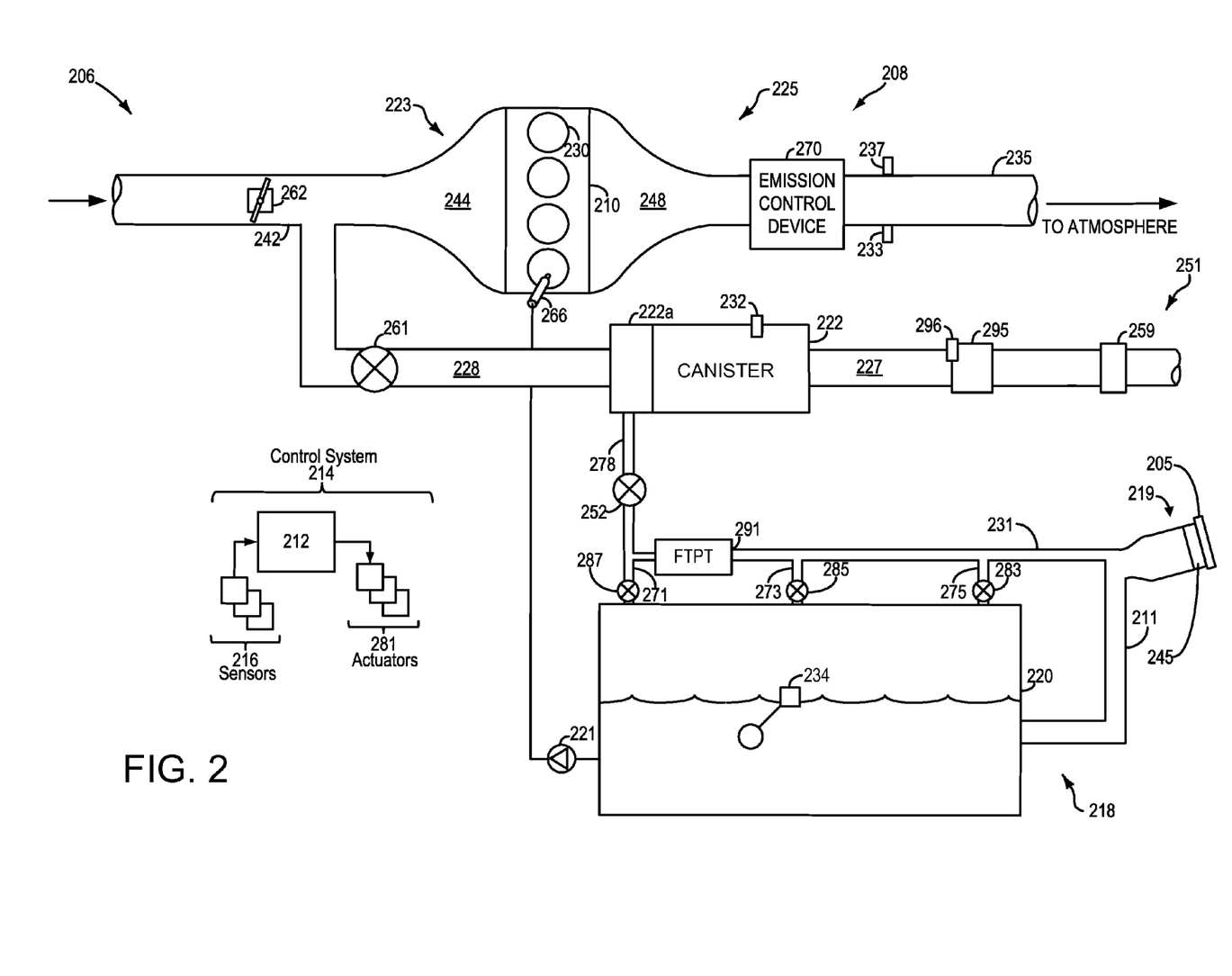
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system. In one non-limiting example, vehicle system 206 may be included as part of vehicle propulsion system 100 (e.g., engine 210 may be one non-limiting example of engine 110).

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222*a* (or buffer region), each of the canister and the buffer comprising the adsorbent. As shown, the volume of buffer 222*a* may be smaller than (e.g., a fraction of) the volume of canister 222. The adsorbent in the buffer 222*a* may be same as, or different from, the adsorbent in the canister (e.g., both may include charcoal). Buffer 222*a* may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is one non-limiting example of control system 190 of FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure sensor 291 (FTPT), and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 252, fuel pump 221, ELCM vacuum pump (not shown in FIG. 2), and refueling lock 245. The control system 214 may include a controller 212. The controller may receive input data from the various sensors, process the input data, and trigger the actuators in response to the processed input data based on instruction or code programmed therein corresponding to one or more routines.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296 (also referred to herein as ELCM PS or canister vent line pressure sensor). Following the applying of vacuum to the fuel system, a change in pressure at the reference orifice (e.g., an absolute change or a rate of change) may be monitored and compared to a threshold. Based on the comparison, a fuel system leak may be diagnosed.

Figure 3A:
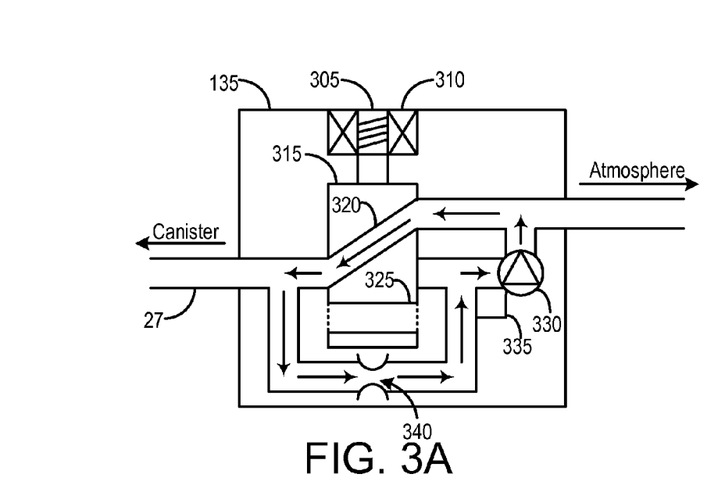
FIG. 3A shows a schematic depiction of an evaporative leak check module in a configuration to perform a reference check.
Figure 3B:
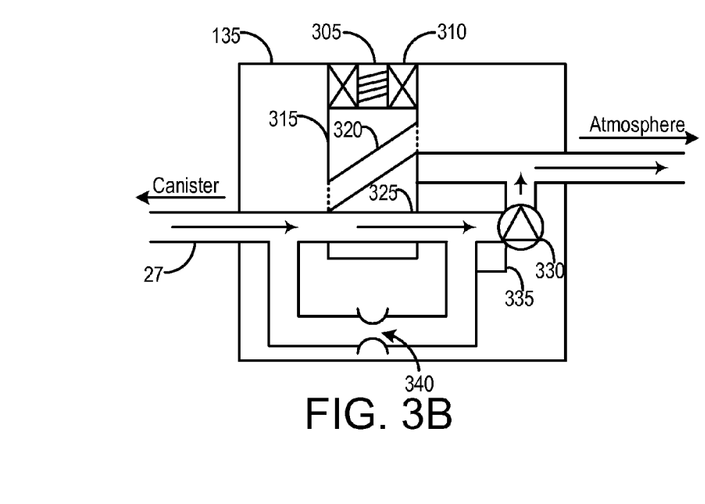
FIG. 3B shows a schematic depiction of an evaporative leak check module in a configuration to perform a fuel system evacuation leak check.
Figure 3C:
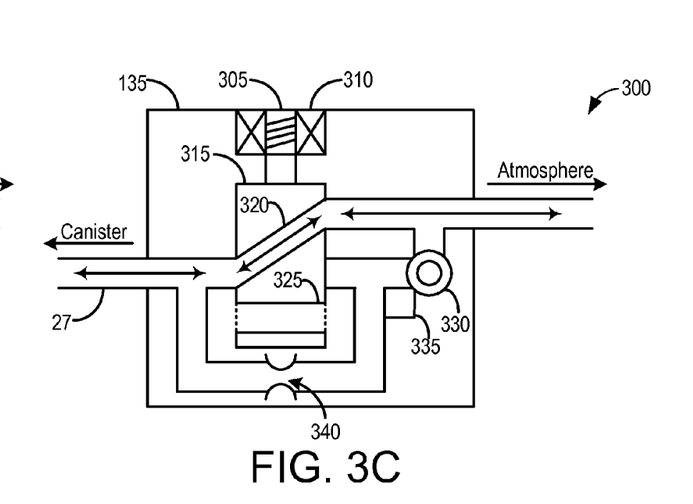
FIG. 3C shows a schematic depiction of an evaporative leak check module in a configuration to perform a purge operation.
Figure 3D:
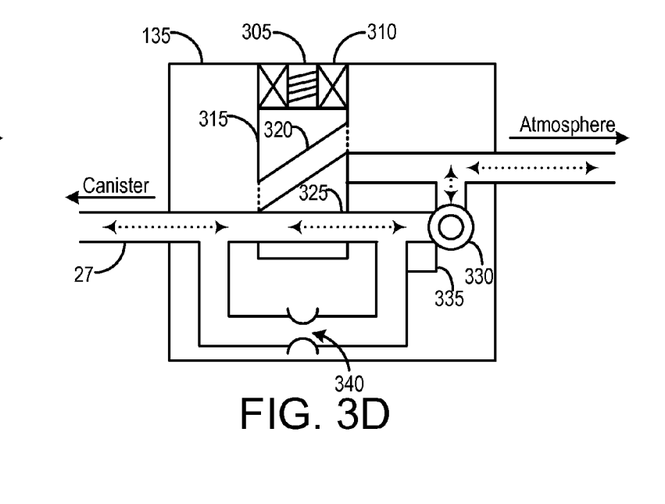
FIG. 3D shows a schematic depiction of an evaporative leak check module in a configuration to perform a fuel tank depressurization operation.

FIGS. 3A-3D show a schematic depiction of an example ELCM 295 in various conditions in accordance with the present disclosure. As shown in FIG. 2, ELCM 295 may be located along vent 227 between canister 222 and atmosphere. The ELCM 295 includes a changeover valve (COV) 315, a pump 330, and a pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold leak to be tested, for example, 0.02". In either the first or second position, pressure sensor 296 may generate a pressure signal reflecting the pressure within ELCM 295. Operation of pump 330 and solenoid 310 may be controlled via signals received from controller 212.

As shown in FIG. 3A, COV 315 is in the first position, and pump 330 is activated in a first direction. Fuel tank isolation valve 252 (not shown) is closed, isolating ELCM 295 from the fuel tank. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for passing/failing a subsequent leak test.

As shown in FIG. 3B, COV 315 is in the second position, and pump 330 is activated in the first direction. This configuration allows pump 330 to draw a vacuum on fuel system 18. In examples where fuel system 18 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of a leak in the system should allow for the vacuum level in ELCM 295 to reach or exceed the previously determined vacuum threshold. In the presence of a leak larger than the reference orifice, the pump will not pull down to the reference check vacuum level.

As shown in FIG. 3C, COV 315 is in the first position, and pump 330 is deactivated. This configuration allows for air to freely flow between atmosphere and the canister. This configuration may be used during a canister purging operation, for example.

As shown in FIG. 3D, COV 315 is in the second position, and pump 330 is deactivated. This configuration allows for air to flow in a restricted manner between atmosphere and the canister. Air flow between atmosphere and the canister is directed through the deactivated pump. A pressure gradient may cause the vanes of the pump to rotate, leaking air down the gradient. As described further herein and with regards to FIGS. 5 and 6, in some embodiments, this configuration may be used during a fuel tank pressure sensor rationality routine.

Thus, a method is described for a fuel emissions system of a hybrid vehicle, wherein when the change-over valve is in the first position, the canister vent line is coupled to atmosphere via a first flow path and a second flow path, the second flow path introducing the restriction via a deactivated vacuum pump.

Hybrid vehicles have sealed tanks designed to withstand pressures and vacuums that result from diurnal temperature cycles. When a request to refuel the fuel tank is received (e.g., the vehicle operator depresses the refueling button), the controller may be configured to depressurize the fuel tank by opening FTIV 252. The fuel door may be unlocked once output from the fuel tank pressure sensor indicates fuel tank pressure is near atmospheric pressure. However, if the fuel tank pressure sensor is degraded, e.g., has failed in range, the fuel tank may be depressurized, yet the fuel tank pressure sensor may indicate the fuel tank is still pressurized. As a result, the fuel door may not unlock. Thus, it may be desirable to perform a rationality check on the fuel tank pressure sensor, such that if degradation is detected, the operator may be notified. FIG. 4 shows a high level flow chart depicting a method for performing a pressure sensor rationality test. Specifically, the routine uses output from a fuel tank pressure sensor, such as FTPT 291, to determine whether to perform an atmospheric or a pressurized fuel tank pressure sensor rationality routine, the details of which are explained in FIGS. 5 and 6. The methods illustrated in FIGS. 4-6 may be carried out by a controller, such as controller 212, according to non-transitory instructions stored in memory and executed by the controller.

Method 400 may begin at 402 by evaluating engine operating conditions. Engine operating conditions may be measured, estimated or inferred, and may include various vehicle conditions, such as vehicle speed, various engine operating conditions, such as engine operating mode, engine speed, engine temperature, exhaust temperature, fuel tank fill level, fuel tank pressure, etc., as well as various ambient conditions, such as ambient temperature, humidity, barometric pressure, etc.

Continuing at 404, method 400 includes determining whether a refueling request has been received. For example, a refueling request may comprise a vehicle operator depression of a button, e.g., refueling button 197, on a vehicle instrument panel in the vehicle, e.g., instrument panel 196. In some examples, a refueling request may comprise a refueling operator requesting access to fuel filler neck 211, for example, by attempting to open a refueling door, and/or attempting to remove a gas cap. In some examples, a refueling request may comprise detecting the proximity of the vehicle to a refueling station, for example, via an on-board GPS, or via wireless communication between the vehicle and a refueling pump. A refueling request may include the operating conditions meeting other entry conditions for a refueling event, including, for example, an engine-off event, a fuel tank fill level less than a threshold, etc.

If a refueling request is not received, or entry conditions for a refueling event are not met, method 400 may end the routine. If a refueling request is received, method 400 may proceed to 406. At 406, method 400 includes determining whether a fuel tank pressure sensor output is near atmospheric pressure. Fuel tank pressure may be determined through a pressure sensor, such as FTPT 291, or may be inferred based on other available data. If the fuel tank pressure is near atmospheric pressure, method 400 may proceed to 408, where an atmospheric fuel tank pressure sensor rationality routine as described in FIG. 5 may be performed. If the fuel tank pressure is not near atmospheric pressure, method 400 may proceed to 410, where a pressurized fuel tank pressure sensor rationality routine may be performed as described in FIG. 6. As used herein "near atmospheric pressure" may include a suitable fuel tank pressure that is within a threshold value of atmospheric pressure. In one example, "near atmospheric pressure" may include fuel tank pressure within 5% or 10% of atmospheric pressure. In another example, "near atmospheric pressure" may include a gage pressure sensor output of 0 inches $H_2O$ or other suitable measurement that indicates fuel tank pressure is at atmospheric pressure.

Briefly, both the atmospheric and pressurized fuel tank pressure sensor rationality routines rely on correlations between the fuel tank pressure sensor output and the pressure in the canister vent line (determined via output from the ELCM PS, for example). For example, fuel tank pressure changes that occur prior to or during refueling may be measured by the fuel tank pressure sensor and compared to pressure measured by the canister vent line pressure sensor. Degradation of the fuel tank pressure sensor may be indicated if the canister vent line pressure sensor indicates a change in pressure that is not detected by the fuel tank pressure sensor.

In most climates and conditions, the fuel tank is typically under vacuum or pressure. Thus, the fuel tank undergoes a pressure change during tank depressurization prior to refueling, and this pressure change may be monitored during the pressurized rationality routine. However, there may be conditions, such as when the vehicle is operated in low diurnal regions (e.g., regions that do not experience large temperature fluctuations over the course of a day) such as San Diego, San Francisco, and Key West, for example, when the fuel tank pressure sensor output may be near atmospheric pressure. Thus, no pressure change occurs prior to the fuel tank refueling, and thus the atmospheric rationality routine may be carried out that monitors pressure changes that result from the refueling event. Another example of conditions that may result in fuel tank pressure being near atmospheric pressure includes when the refueling event occurs at the "zero crossing" in the diurnal cycle when the fuel tank is transitioning between pressure/vacuum or vacuum/pressure. Alternately, there may be an inherent leak in the evaporation system that may be lower than 0.02" which is the threshold of detection, in which case, the fuel tank pressure sensor output may read near atmospheric pressure. Not limiting to these scenarios, there may be other conditions wherein the fuel tank pressure sensor output reads near atmospheric pressure. FIG. 5 shows a high level flow chart for performing the fuel tank pressure sensor rationality routine when the fuel tank pressure sensor (e.g., FTPT 291) output is near atmospheric pressure.

Method 500 may begin at 502 wherein the controller may be instructed to perform the evaporative leak check during refueling (due to a refueling request that occurs while the fuel tank is atmospheric pressure, as explained above). At 504, a fuel tank isolation valve such as FTIV 252 for example, coupled in a conduit between a fuel tank (e.g., fuel tank 220) and a fuel vapor canister (such as canister 222) may be opened. The fuel tank isolation valve (hereafter referred to as FTIV) is typically opened to depressurize the system. At 506 of method 500, a restriction may be created in the canister vent line, by placing or maintaining a change-over valve (such as COV 315) in a first position, as described in FIG. 3C, and an ELCM vacuum pump, such as pump 330, may be de-activated. Thus, the method includes maintaining the fuel vapor canister vent line restriction during refueling and further comprises placing or maintaining a change-over valve positioned in the canister vent line in a first position. In this configuration, two flow paths are created, a first flow path in which the canister/vent line is fully open to the atmosphere, and a second flow path where air and/or fuel vapors from the canister and fuel tank are pushed through the leak reference orifice (such as orifice 340) and deactivated vacuum pump. This causes a restriction within the second flow path, allowing the ELCM PS to detect pressure within the canister vent line without causing an overpressure event during the fuel tank refuel.

Refueling may cause a spike in the output of the fuel tank pressure sensor. Because the FTIV is open, the spike in the output of the fuel tank pressure sensor may be reflected in the output of the ELCM PS output. At 508 of method 500, it may be checked if the ELCM PS output is increasing. If the ELCM PS output increase is less than a threshold amount (e.g., if the ELCM PS output increases by less than 5 or 10%) during refueling, then at 510, it is indicated that the FTIV may be degraded. For example, if the FTIV is stuck closed, fuel vapors that would otherwise by pushed out of the fuel tank and through the canister to the ELCM PS are instead trapped in the fuel tank, and as a result the increase in the fuel tank pressure detected by the fuel tank pressure sensor may not be reflected in the ELCM PS output. If it is determined that the FTIV is degraded, the method 500 proceeds to 524 wherein the controller 212 may be instructed to perform default action and/or adjust engine operating parameters. Thus, the method described for a fuel emission system of a hybrid vehicle comprises adjusting one or more engine operating parameters based on the indicated degradation. In one example, the default action may include notifying an operator of the degradation, such as by illuminating a malfunction indicator lamp, and/or setting a diagnostic code. Example engine operating parameters that may be adjusted in response to a degraded FTIV may include adjusting a position of the COV to compensate for a FTIV that is stuck open, for example, performing a canister purge routine with a greater frequency to ensure the canister does not become overloaded (which may include purposely operating the engine, even during battery-only modes of operation), cycling the FTIV to attempt to unstick the valve, and other operating parameters.

If the ELCM PS output does increase by at least the threshold amount, method 500 proceeds to 512 where the controller 212 may be instructed to monitor output of the fuel tank pressure sensor (FTPT 291, for example) and ELCM PS (ELCM PS 296, for example).

It may be possible to correlate the canister vent line pressure as indicated by ELCM PS output and fuel tank pressure as indicated by fuel tank pressure sensor output by comparing the rate of change of fuel tank pressure sensor output with rate of change of ELCM PS output. At 514 of method 500, the rate of change of ELCM PS 296 output (d[ELCM PS]/dt) may be compared to the threshold rate. This threshold rate may be the rate of change of fuel tank pressure sensor output, for example. Alternately, the threshold rate may be another suitable threshold rate such as an expected rate determined by the rate at which the tank is filled, for example. If d[ELCM PS]/dt is different from the threshold rate (e.g., is 10% or more greater or less than the threshold rate), then at 520 of method 500, it may be indicated that ELCM PS may be degraded, and the method 500 proceeds to 524 where the controller 212 may be instructed to perform default action and/or adjust engine operating parameters as described above. In one example, degradation of the ELCM PS may be indicated when the rate of change of the ELCM PS output remains near zero (e.g., the output does not change), even as the FTPT output changes, or when the rate of change of the ELCM PS is significantly lower than the rate of change of the FTPT.

If d[ELCM PS]/dt is equal to the threshold rate when compared at 514, method 500 proceeds to 516, where the rate of change of the fuel tank pressure sensor (d[FTPT]/dt) may be compared to the same threshold rate. This threshold rate may be the rate of change of ELCM PS output, for example. Alternately, the threshold may be another suitable rate, as mentioned above. If d[FTPT]/dt is different from the threshold rate, then at 522 of method 500, it may be indicated that the fuel tank pressure sensor may be degraded, and the method 500 proceeds to 524 where the controller 212 may be instructed to perform default action and/or adjust engine operating parameters. For example, the vehicle may experience failed emission test and/or the check-engine-light (CEL) may be illuminated as a result of a degraded fuel tank pressure sensor. In one example, degradation of the FTPT may be indicated when the rate of change of the FTPT output remains near zero (e.g., the output does not change), even as the ELCM PS output changes, or when the rate of change of the FTPT is significantly lower than the rate of change of the ELCM PS.

If d[FTPT]/dt is equal to the threshold rate, then at 518 of method 500, it may be indicated both the fuel tank pressure sensor and the ECLM PS passed the rationality check (e.g., no degradation is indicated for the fuel tank pressure sensor or the ECLM PS).

Thus, the method 500 comprises during a refueling event, while the fuel tank pressure is within a threshold range of atmospheric pressure, maintaining a fuel vapor canister vent line restriction, and indicating degradation of a fuel tank pressure sensor (FTPT) based on a pressure in the canister vent line (for example, as determined by an ELCM PS). The method 500 further indicates degradation of a fuel tank pressure sensor based on a pressure in the canister vent line by correlating the pressure in the canister vent line to fuel tank pressure sensor output, the pressure in the canister vent line determined by a canister vent line pressure sensor ELCM PS. The method wherein correlating pressure in the canister vent line and the fuel tank pressure sensor output further comprises comparing the fuel tank pressure sensor output with the canister vent line pressure sensor output, and further includes indicating fuel tank isolation valve degradation when the canister vent line pressure sensor output changes by less than a threshold amount during refueling event, even as the fuel tank pressure sensor output changes. The method for a fuel emissions system of a hybrid vehicle of claim 5, wherein correlating the canister vent line pressure and the fuel tank pressure sensor signal further comprises comparing a rate of change fuel tank pressure sensor output with a rate of change of canister vent line pressure sensor output and indicating fuel tank pressure sensor degradation when the rate of change of fuel tank pressure sensor output is lower than the rate of change of the canister vent line pressure sensor output by at least a threshold amount. The method wherein correlating the canister vent line pressure and the fuel tank pressure sensor signal further comprises comparing a rate of change fuel tank pressure sensor output with a rate of change of canister vent line pressure sensor output and indicating canister vent line pressure sensor degradation when the rate of change of the canister vent line pressure sensor is lower than the rate of change of the fuel tank pressure sensor output by at least a threshold amount.

As explained in FIG. 4, if a refueling request is received, and the fuel tank pressure is not near atmospheric pressure, then a pressurized fuel tank pressure sensor rationality routine may be performed. In most climates and conditions, the fuel tank is typically under vacuum or pressure, except in the conditions discussed earlier when the fuel tank pressure sensor is near atmospheric pressure. FIG. 6 shows a flow chart for performing the pressurized fuel tank pressure sensor rationality routine. Method 600 may begin at 602, where the COV is placed in the second position as described in FIG. 3D. In this position, the COV is further configured to couple the fuel vapor canister to atmosphere via the vacuum pump. As explained earlier, the solenoid of the COV is energized in this second position. At 604, during the evaporative leak check routine, the fuel tank isolation valve (FTIV) coupled in a conduit between a fuel tank and fuel vapor canister may be opened. As mentioned above, the FTIV is typically opened to depressurize the system. The fuel tank is pressurized, hence when the FTIV is opened, the ELCM PS may detect this increased pressure, causing an increase in its output. However, the fuel tank pressure sensor output may begin to decrease, due to the built up pressure in the fuel tank suddenly being released to the canister vent line and atmosphere. At 606 of method 600, it may be checked if the ELCM PS output is increasing by a threshold amount (increasing by more than 5 or 10%). If the ELCM PS output is not increasing, then the method 600 proceeds to 608, wherein it may be indicated that the FTIV may be degraded. For example, if the FTIV is stuck closed, then the ELCM PS may not be able to detect the pressure of the fuel tank, and the output of ELCM PS may not change. The method 600 then proceeds to 622 where the controller may perform a default action and/or adjust engine operating parameters as described earlier. If ELCM PS output is increasing as expected, then method 600 proceeds to 610 where the controller is instructed to monitor the fuel tank pressure sensor (FTPT) and ELCM PS outputs. After the initial increase in the ELCM PS output and corresponding decrease in the fuel tank pressure sensor output, both the outputs may begin to decrease at a rate that may depend on the rate of refueling, for example. Similar to FIG. 5, the controller compares these rates and thereby performs the pressurized fuel tank pressure sensor rationality. Briefly, at 612 of method 600, d[ELCM PS]/dt may be compared to the threshold rate. As explained earlier, this threshold rate may be the rate of change of fuel tank pressure sensor output, for example. If d[ELCM PS]/dt is different from the threshold rate, then at 618, it may be indicated that ELCM PS may be degraded, and the method 600 proceeds to 622 where the controller may perform default action and/or adjust engine operating parameters as described above. If d[ELCM PS]/dt is equal to the threshold rate when compared at 612, method 600 proceeds to 614, where d[FTPT]/dt may be compared to the same threshold rate (which may be the rate of change of ELCM PS output, for example). If d[FTPT]/dt is different from the threshold rate, then at 620 of method 600, it may be indicated that FTPT may be degraded, and method 600 proceeds to 622 as described above. If d[ELCM PS]/dt is equal to the threshold rate, then at 616 of method 600, it may be indicated both the fuel tank pressure sensor and ELCM PS passed the rationality check.

Thus, the method 600 comprises a rationality check for the pressure sensors in response to a refuel request when the fuel tank pressure is not equal to atmospheric pressure. It further includes indicating degradation of a fuel tank pressure sensor based on a correlation between fuel tank pressure sensor (FTPT) output and canister vent line pressure (ELCM PS) during fuel tank depressurization prior to the fuel tank refuel.

FIG. 7 is a diagram 700 showing an example relationship between the fuel tank pressure sensor and canister vent line pressure sensor outputs during the atmospheric fuel tank pressure sensor rationality routine described in FIG. 5. The first plot from the top of diagram 700 shows the fuel tank level as indicated by fuel tank level sensor 234. The second and third plots show fuel tank pressure sensor FTPT output and ELCM PS output respectively. For each plot, time is depicted along the x (horizontal) axis while values of each respective parameter are depicted along the y (vertical) axis.

At time $t_0$, a refuel request may be received. It may be determined that FTPT output is near atmospheric pressure as indicated by curve 704 at time $t_0$. The controller 212 may then perform the atmospheric fuel tank pressure sensor rationality routine as described in FIG. 5. As described in method 500, at time $t_1$, the FTIV may be opened (not shown here) at 504 and refueling may begin. The COV may be maintained in the first position. Due to refueling, the ELCM PS and the fuel tank pressure sensor output may begin to increase. This can be seen in curves 704 and 706. If at time $t_1$, the ELCM PS output does not change, it may be due to a degraded FTIV as explained in FIG.5. If at time $t_1$, the fuel tank pressure sensor output does not change, as indicated by dashed line 708, it may be due to a degraded fuel tank pressure sensor.

At $t_2$, after the initial spike in the pressure outputs of the fuel tank pressure sensor and ELCM PS due to refueling, both the outputs may begin to decrease as seen in curves 704 and 706. During time points between $t_3$ and $t_4$, the rates of change of the fuel tank pressure sensor output (d[FTPT]/dt) and the ELCM PS output (d[ELCM PS]/dt) given by the slopes of the curves 704 and 706 may be compared to a threshold rate as described in detail in method 500 and degradation may be indicated as explained in method 500. For example, the rate of change of the fuel tank pressure sensor output may be compared to the rate of change of ELCM PS output. Degradation may be indicated if the rates of change of the sensor outputs are different from each other. The slopes of curves 704 and 706, may further be compared at later time points $t'_3$ and $t'_4$, and terminated at $t_5$ when the fuel tank level has reached a maximum threshold.

FIG. 8 shows an example relationship between the fuel tank pressure sensor and the canister vent line pressure sensor outputs during the pressurized fuel tank pressure sensor rationality routine described in FIG. 6. The first plot from the top of diagram 800 shows the fuel tank pressure sensor output. The second plot shows the ELCM PS output. The third and fourth plots show the position of the COV in the canister vent line and position of the fuel tank isolation valve respectively. For each plot, time is depicted along the x (horizontal) axis while values of each respective parameter are depicted along the y (vertical) axis.

At time $t_0$, a refuel request may be received. It may be determined that the fuel tank pressure sensor output is not near atmospheric pressure as indicated by curve 802 at time $t_0$. The controller 212 may then be directed to perform the pressurized fuel tank pressure sensor rationality routine described in FIG. 6. As elaborated in method 600, at time $t_1$, the COV is placed in the second position as indicated by 806. Additionally, the pump 330 is not activated, and COV 315 is configured to couple the fuel vapor canister 222 to atmosphere as explained in FIG. 3B and hence the ELCM PS output as indicated by 804 is near atmospheric pressure. However the fuel tank pressure sensor output remains unchanged since the fuel tank isolation valve is in the first position (e.g., closed). When the controller is requested to open the fuel tank isolation valve at time $t_2$ in 800, the fuel tank isolation valve is placed in a second (open) position as indicated by 808. As expected, both the fuel tank pressure sensor and the ELCM PS outputs begin to decrease as seen in curves 802 and 804, after time point $t_2$.

During time between $t_3$ and $t_4$, the rates of change of fuel tank pressure sensor output (d[FTPT]/dt) and ELCM PS output (d[ELCM PS]/dt) given by the slopes of the curves 802 and 804 may be compared to a threshold rate (or to each other, as explained earlier) and degradation may be indicated as discussed in method 600.

In this way, the methods described here may be used as a hybrid diagnostics to validate fuel tank pressure sensor rationality. If pressure exists inside the fuel tank, then the rationality may be performed during depressurization, however, if there is no pressure inside the tank, the rationality may be performed during refueling. Thus, the method, comprising responsive to a request to perform a fuel tank refuel, includes determining if fuel tank pressure is equal to atmospheric pressure and if fuel tank pressure is not equal to atmospheric pressure, includes indicating degradation of a fuel tank pressure sensor based on a correlation between fuel tank pressure sensor output and canister vent line pressure during fuel tank depressurization prior to the fuel tank refuel. If fuel tank pressure is equal to atmospheric pressure, then the method includes indicating degradation of the fuel tank pressure sensor based on a correlation between fuel tank pressure sensor output and canister vent line pressure during the fuel tank refuel. In addition, the method, wherein if fuel tank pressure is not equal to atmospheric pressure, indicating degradation of the fuel tank pressure sensor further comprises placing a change-over valve positioned in the canister vent line into a second position, opening a fuel tank isolation valve coupled in a conduit between the fuel tank and a fuel vapor canister and indicating degradation of the fuel tank pressure sensor if a rate of change of fuel tank pressure sensor output is less than a rate of change of canister vent line pressure during the fuel tank depressurization. The method, wherein if fuel tank pressure is equal to atmospheric pressure, indicating degradation of the fuel tank pressure sensor comprises placing a change-over valve positioned in the canister vent line into a first position, opening a fuel tank isolation valve coupled in a conduit between the fuel tank and a fuel vapor canister and indicating degradation of the fuel tank pressure sensor if a rate of change of fuel tank pressure sensor output is less than a rate of change of canister vent line pressure during the fuel tank refuel. The method, wherein placing the change-over valve into the first position creates a restriction in a flow path between the canister vent line and atmosphere, canister vent line pressure determined via a pressure sensor positioned in the flow path.

In another representation, a method comprises during select fuel tank refueling conditions, indicating degradation of a fuel tank pressure sensor by correlating fuel tank pressure sensor output with canister vent line pressure as fuel tank pressure increases during the fuel tank refueling. The method further comprises, prior to fuel tank refueling, placing a change-over valve positioned in the canister vent line to a first position. Furthermore, the method comprises wherein indicating degradation of the fuel tank pressure sensor by correlating fuel tank pressure sensor output with canister vent line pressure comprises indicating degradation if fuel tank pressure sensor output increases at a lower rate than canister vent line pressure.

In an example, a system for a hybrid-electric vehicle described here, comprises of a fuel tank isolation valve coupled in a conduit between a fuel tank and a fuel vapor canister, a fuel tank pressure sensor, an evaporative leak check module (ELCM) coupled in a conduit between the fuel vapor canister and atmosphere, the ELCM comprising a vacuum pump, an ELCM pressure sensor, and a change-over valve operable between first position and a second position and a controller configured with instructions stored in non-transitory memory that when executed cause the controller to during refueling of the fuel tank, perform an evaporative leak check routine by adjusting the change-over valve to the first position and comparing fuel tank pressure sensor output and ELCM pressure sensor output and indicating degradation of the fuel tank pressure sensor when a rate of change of the fuel tank pressure sensor output is lower than the a rate of change of the ELCM pressure sensor output by at least a threshold amount. The system, wherein the change-over valve is configured to couple the fuel vapor canister to atmosphere via a first, unrestricted flow path and a second, restricted flow path when in the first position. The system, where the change-over valve is further configured to couple the fuel vapor canister to atmosphere via the vacuum pump when in a second position. The system, wherein the change-over valve comprises a solenoid that places the change-over valve into the first position when de-energized and into the second position when energized. The system, wherein the evaporative leak check routine is performed only when fuel tank pressure is within a threshold range of atmospheric pressure. The system, wherein during the evaporative leak check routine, the fuel tank isolation valve is open. The system, wherein the evaporative leak check routine is further performed by monitoring ELCM pressure sensor output during the refuel and indicating degradation of the fuel tank isolation valve when the ELCM pressure sensor output changes by less a threshold amount. The system, wherein the evaporative leak check routine is further performed by comparing fuel tank pressure sensor output and ELCM pressure sensor output and indicating degradation of the ELCM pressure sensor when a rate of change of the ELCM pressure sensor output is lower than a rate of change of the fuel tank pressure sensor output by at least a threshold amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel emissions system of a hybrid vehicle, comprising:
   during a refueling event when a fuel tank is being refueled and while a fuel tank level is increasing,
      maintaining a fuel vapor canister vent line restriction; and
      indicating degradation of a fuel tank pressure sensor based on a pressure in a canister vent line.

2. The method for a fuel emissions system of a hybrid vehicle of claim 1, further comprising adjusting one or more engine operating parameters based on the indicated degradation.

3. The method for a fuel emissions system of a hybrid vehicle of claim 1, wherein maintaining the fuel vapor canister vent line restriction during refueling further comprises placing a change-over valve positioned in the canister vent line in a first position.

4. The method for a fuel emissions system of a hybrid vehicle of claim 3, wherein when the change-over valve is in the first position, the canister vent line is coupled to atmosphere via a first flow path and a second flow path, the second flow path introducing the restriction via a deactivated vacuum pump.

5. The method for a fuel emissions system of a hybrid vehicle of claim 1, wherein indicating degradation of a fuel tank pressure sensor based on a pressure in the canister vent line comprises correlating the pressure in the canister vent line to fuel tank pressure sensor output, the pressure in the canister vent line determined by a canister vent line pressure sensor.

6. The method for a fuel emissions system of a hybrid vehicle of claim 5, wherein correlating pressure in the canister vent line and the fuel tank pressure sensor output comprises:
   comparing the fuel tank pressure sensor output with canister vent line pressure sensor output; and
   indicating fuel tank isolation valve degradation when the canister vent line pressure sensor output changes by less than a threshold amount during the refueling event, even as the fuel tank pressure sensor output changes.

7. The method for a fuel emissions system of a hybrid vehicle of claim 5, wherein correlating the canister vent line pressure and the fuel tank pressure sensor signal further comprises:
   comparing a rate of change of fuel tank pressure sensor output with a rate of change of canister vent line pressure sensor output; and
   indicating fuel tank pressure sensor degradation when the rate of change of fuel tank pressure sensor output is lower than the rate of change of the canister vent line pressure sensor output by at least a threshold amount.

8. The method for a fuel emissions system of a hybrid vehicle of claim 5, wherein correlating the canister vent line pressure and the fuel tank pressure sensor signal further comprises:
comparing a rate of change of fuel tank pressure sensor output with a rate of change of canister vent line pressure sensor output; and
indicating canister vent line pressure sensor degradation when the rate of change of the canister vent line pressure sensor is lower than the rate of change of the fuel tank pressure sensor output by at least a threshold amount.

9. A system for a hybrid-electric vehicle, comprising:
a fuel tank isolation valve coupled in a conduit between a fuel tank and a fuel vapor canister;
a fuel tank pressure sensor;
an evaporative leak check module (ELCM) coupled in a conduit between the fuel vapor canister and atmosphere, the ELCM comprising a vacuum pump, an ELCM pressure sensor, and a change-over valve operable between a first position and a second position; and
a controller configured with instructions stored in non-transitory memory that when executed cause the controller to:
during refueling of the fuel tank, perform an evaporative leak check routine by:
adjusting the change-over valve to the first position; and
comparing fuel tank pressure sensor output and ELCM pressure sensor output and indicating degradation of the fuel tank pressure sensor when a rate of change of the fuel tank pressure sensor output is lower than a rate of change of the ELCM pressure sensor output by at least a threshold amount.

10. The system of claim 9, wherein the change-over valve is configured to couple the fuel vapor canister to atmosphere via a first, unrestricted flow path and a second, restricted flow path when in the first position.

11. The system of claim 10, where the change-over valve is further configured to couple the fuel vapor canister to atmosphere via the vacuum pump when in the second position.

12. The system of claim 11, wherein the change-over valve comprises a solenoid that places the change-over valve into the first position when de-energized and into the second position when energized.

13. The system of claim 9, wherein the evaporative leak check routine is performed only when fuel tank pressure is within a threshold range of atmospheric pressure.

14. The system of claim 9, wherein during the evaporative leak check routine, the fuel tank isolation valve is open.

15. The system of claim 9, wherein the evaporative leak check routine is further performed by monitoring the ELCM pressure sensor output during the refueling and indicating degradation of the fuel tank isolation valve when the ELCM pressure sensor output changes by less than a threshold amount.

16. The system of claim 9, wherein the evaporative leak check routine is further performed by comparing fuel tank pressure sensor output and ELCM pressure sensor output and indicating degradation of the ELCM pressure sensor when the rate of change of the ELCM pressure sensor output is lower than the rate of change of the fuel tank pressure sensor output by at least a threshold amount.

17. A method, comprising:
responsive to a request to perform a fuel tank refuel, comparing fuel tank pressure to atmospheric pressure;
when fuel tank pressure is not equal to atmospheric pressure, indicating degradation of a fuel tank pressure sensor based on a correlation between fuel tank pressure sensor output and canister vent line pressure during fuel tank depressurization prior to the fuel tank refuel; and
when fuel tank pressure is substantially equal to atmospheric pressure, indicating degradation of the fuel tank pressure sensor based on a correlation between fuel tank pressure sensor output and canister vent line pressure during the fuel tank refuel and while a fuel tank level is increasing.

18. The method of claim 17, wherein when fuel tank pressure is not equal to atmospheric pressure, indicating degradation of the fuel tank pressure sensor comprises:
placing a change-over valve positioned in a canister vent line into a second position;
opening a fuel tank isolation valve coupled in a conduit between the fuel tank and a fuel vapor canister; and
indicating degradation of the fuel tank pressure sensor when a rate of change of fuel tank pressure sensor output is less than a rate of change of canister vent line pressure during the fuel tank depressurization.

19. The method of claim 17, wherein when fuel tank pressure is equal to atmospheric pressure, indicating degradation of the fuel tank pressure sensor comprises:
placing a change-over valve positioned in a canister vent line into a first position;
opening a fuel tank isolation valve coupled in a conduit between the fuel tank and a fuel vapor canister; and
indicating degradation of the fuel tank pressure sensor when a rate of change of fuel tank pressure sensor output is less than a rate of change of canister vent line pressure during the fuel tank refuel.

20. The method of claim 19, wherein placing the change-over valve into the first position creates a restriction in a flow path between the canister vent line and atmosphere, and wherein canister vent line pressure is determined via a pressure sensor positioned in the flow path.

* * * * *